(12) United States Patent
Ogawa et al.

(10) Patent No.: US 7,680,121 B2
(45) Date of Patent: Mar. 16, 2010

(54) TRANSMISSION APPARATUS, METHOD AND PROGRAM

(75) Inventors: Katsuhisa Ogawa, Tokyo (JP); Masahiko Kosaka, Kanagawa (JP); Naohiko Suzuki, Tokyo (JP); Hiroaki Nakazawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 576 days.

(21) Appl. No.: 10/892,807

(22) Filed: Jul. 16, 2004

(65) Prior Publication Data
US 2005/0036491 A1 Feb. 17, 2005

(30) Foreign Application Priority Data
Jul. 25, 2003 (JP) .............................. 2003-201929

(51) Int. Cl.
*H04L 12/56* (2006.01)
(52) U.S. Cl. .................... 370/395.2; 370/252; 370/254; 370/389
(58) Field of Classification Search ...................... None
See application file for complete search history.

(56) References Cited

U.S. PATENT DOCUMENTS

| | | | |
|---|---|---|---|
| 5,426,637 A * | 6/1995 | Derby et al. ................. 370/401 |
| 5,709,861 A * | 1/1998 | Santiago et al. .......... 424/184.1 |
| 5,949,414 A | 9/1999 | Namikata et al. |
| 6,556,569 B1 * | 4/2003 | Ogawa et al. ............. 370/395.2 |
| 6,636,516 B1 * | 10/2003 | Yamano ................. 370/395.52 |
| 6,982,966 B2 * | 1/2006 | Eidenschink et al. ........ 370/322 |
| 7,013,343 B2 * | 3/2006 | Shigezumi ................... 709/232 |
| 7,092,917 B2 * | 8/2006 | Nakamura et al. ............. 705/80 |
| 7,191,236 B2 * | 3/2007 | Simpson-Young et al. .. 709/228 |
| 7,480,284 B2 * | 1/2009 | Wengrovitz et al. ......... 370/352 |
| 2001/0052007 A1 * | 12/2001 | Shigezumi ................... 709/223 |
| 2002/0143989 A1 | 10/2002 | Huitema et al. |
| 2002/0168970 A1 | 11/2002 | Myojo |
| 2003/0069921 A1 * | 4/2003 | Lamming et al. ............ 709/203 |
| 2003/0169728 A1 * | 9/2003 | Choi .......................... 370/352 |
| 2003/0188013 A1 * | 10/2003 | Nishikado et al. ........... 709/238 |
| 2003/0191848 A1 * | 10/2003 | Hesselink et al. ........... 709/229 |
| 2004/0196491 A1 * | 10/2004 | Uchino ...................... 358/1.15 |
| 2005/0002406 A1 * | 1/2005 | Miyata et al. ............... 370/401 |
| 2005/0193103 A1 * | 9/2005 | Drabik ....................... 709/221 |

\* cited by examiner

*Primary Examiner*—Kwang B Yao
*Assistant Examiner*—Nguyen Ngo
(74) *Attorney, Agent, or Firm*—Cowan, Liebowitz & Latman, P.C.

(57) ABSTRACT

A transmission apparatus connected to a first network obtains information on a device connected to a third network, to which a destination of communication with a communication device connected to a second network is connected, and transmits the obtained information to a device connected to the second network via the first network.

10 Claims, 10 Drawing Sheets

FIG. 2

|  | IPv6 ADDRESS | PREFIX LENGTH |
|---|---|---|
| NETWORK A | 2001 : 340 : 1 : 2 : : |  |
| INTERNET TELEPHONE A | 2001 : 340 : 1 : 2 : : 1 | / 64 |
| DIGITAL CAMERA | 2001 : 340 : 1 : 2 : : 2 | / 64 |
| NETWORK B | 3ffe : 514 : 2 : 1 : : |  |
| INTERNET TELEPHONE B | 3ffe : 514 : 2 : 1 : : 1 | / 64 |
| PRINTER | 3ffe : 514 : 2 : 1 : : 3 | / 64 |

F I G. 5

| | DEVICE ID | TYPE | ADDRESS | PREFIX LENGTH | NET ACCESS | ... |
|---|---|---|---|---|---|---|
| | 501 | 502 | 503 | 504 | 505 | |
| 511 | IX000123 | CAMERA | 2001:340:1:2::2 | /64 | ON | |
| 512 | BJ000011 | PRINTER | 3ffe:514:2:1::3 | /64 | ON | |
| 513 | BJ003210 | PRINTER | 2001:200:1:1::1 | /64 | OFF | |
| | .. | .. | .. | .. | .. | .. |

FIG. 6

| | 601 | 602 | 603 | 604 | |
|---|---|---|---|---|---|
| | SESSION ID | STATUS | ADDRESS 1 / PREFIX LENGTH | ADDRESS 2 / PREFIX LENGTH | ... |
| 611 | 000135 | CONNECT | 2001 : 340 : 1 : 2 :: 1/64 | 3ffe : 514 : 2 : 1 :: 1/64 | |
| 612 | 102034 | RING | 2001 : 200 :: 12/64 | 2001 : 200 : 2 :: 1/64 | |
| 613 | 197231 | BYE | 3ffe : 500 : 1 : 2 :: 2/64 | 2001 : 3401 : 1 :: 23/64 | |
| | .. | .. | .. | .. | .. |

FIG. 10

| SESSION ID | STATUS | ADDRESS 1 / PREFIX LENGTH | DEVICE INFORMATION | ADDRESS 2 / PREFIX LENGTH | DEVICE INFORMATION | ... |
|---|---|---|---|---|---|---|
| 000135 | CONNECT | 2001:340:1:2::1/64 | 511 | 3ffe:514:2:1::1/64 | 512 | |
| 102034 | RING | 2001:200::12/64 | | 2001:200:2::1/64 | | |
| 197231 | BYE | 3ffe:500:1:2::2/64 | | 2001:3401:1::23/64 | | |
| .. | .. | .. | .. | .. | .. | .. |

TRANSMISSION APPARATUS, METHOD AND PROGRAM

FIELD OF THE INVENTION

The present invention relates to a transmission apparatus connected to a network, transmission method and program for the apparatus.

BACKGROUND OF THE INVENTION

Conventionally, in a communication network such as the Internet, DNS (Domain Name System) is known as the most general name resolution. In the DNS, it is necessary to obtain the absolute domain name (FQDN: Fully Qualified Domain Name) of a communication destination (party at the other end of communication). Further, in this system, access control in accordance with status cannot be performed.

On the other hand, in a peer-to-peer environment, name resolution is made by an own system of application. To discriminate a particular destination, an ID is utilized, and access control in accordance with status can be performed. In such peer-to-peer application, previous settings are required for access control. A peer-to-peer name resolution is disclosed in e.g. U.S. Patent Application NO. US2002/0143989.

However, there is no name resolution specialized for peer-to-peer connection for non-PC devices such as a printer and a digital still camera connectable to a communication network. Further, in non-PC device peer-to-peer connection, a communication destination cannot be specified without difficulty.

Further, access control in non-PC device peer-to-peer connection cannot be realized, and in such non-PC device, identification of a communication destination and simple access control cannot be realized without previous settings.

SUMMARY OF THE INVENTION

The present invention has been made to solve the above problems, and has its object to facilitate identification of a communication destination.

Further, the present invention has another object to facilitate communication with a destination without previous settings.

To attain the above objects, the present invention provides a transmission apparatus connected to a first network, which obtains information on a device connected to a third network, to which a communication destination of a communication device connected to a second network is connected, and which transmits the obtained information to a device connected to the second network via the first network, transmission method and program for the apparatus.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a table showing an example of respective network information and IPv6 addresses of the networks, devices and terminals connected to the networks;

FIG. 5 is a table showing an example of device information registered in a device database 405 in a rendezvous server 109;

FIG. 6 is a table showing an example of session information recorded in a session database 408 in a session management server 108;

FIG. 10 is a table showing another example of the session information recorded in the session database 408 in the session management server 108.

DETAILED DESCRIPTION OF THE PREFERRED EMBODIMENT

Hereinbelow, a preferred embodiment of the present invention will now be described in detail in accordance with the accompanying drawings.

In the present embodiment, to directly transmit data from a user A's digital still camera to a user B's printer, designation of the user B's printer from the user A's digital still camera is realized with an extremely simple operation. Further, on the user B side, an arbitrary person's access to the printer can be rejected, and data transmission permission can be given to a particular person, and further, access permission to the particular person can be given in a real time manner.

Figure 1:
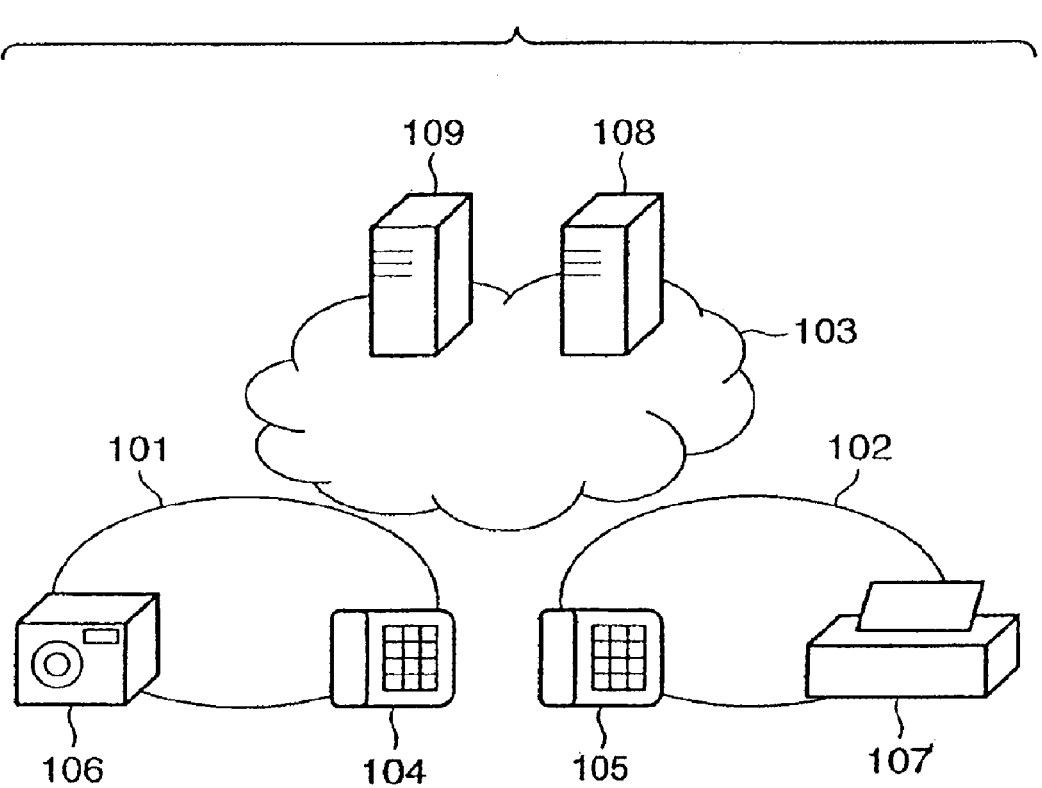
FIG. 1 is a schematic diagram showing an arrangement of a network according to an embodiment of the present invention.

FIG. 1 is a schematic diagram showing an arrangement of a network according to the present embodiment. In FIG. 1, reference numeral 101 denotes a network A to which the user A's communication terminal to be described in detail later is connected; 102, a network B to which the user B's communication terminal to be described in detail later is connected; and 103, an IPv6 internet to provide data communication utilizing an IPv6 communication protocol between the network A 101 and the network B 102. The network A 101 and the IPv6 internet 103, and the network B 102 and the IPv6 internet 103 are connected via a router (not shown). That is, the network A 101 and the network B 102 are connected as follows:

Network A 101—(Router)—IPv6 Internet 103—(Router)—Network B 102

Numeral 104 denotes an internet telephone terminal A as the user A's communication terminal connected to the network A 101; and 105, an internet telephone terminal B as the user B's communication terminal connected to the network B 102.

The user A's internet telephone terminal A 104 and the user B's internet telephone terminal B 105 can realize telephone communication functions (calling to destination terminal, establishment of session, voice IP packet communication etc.) via the IPv6 internet 103. Further, upon telephone communication between the user A's internet telephone terminal A 104 and the user B's internet telephone terminal B 105, a session management server 108 to be described later controls and manages the communication session.

Numeral 106 denotes the user A's digital still camera connected to the network A 101, having an IPv6 communication protocol function; and 107, the user B's printer connected to the network B 102, having the IPv6 communication protocol function. The digital still camera 106 and the printer 107 realize a data communication function via the IPv6 internet 103.

The session management server 108 connected to the IPv6 internet 103 mainly provides the following functions.

(1) address solution of an internet telephone terminal as a communication destination specified with a telephone number or E-mail address
(2) control of calling to an internet telephone terminal as a communication destination
(3) presentation of communication session start information to two Internet telephone terminals
(4) collection of communication session termination information between two internet telephone terminals Numeral 109 denotes a rendezvous server connected to the IPv6 internet, which provides a so-called name resolution server function of searching for a communication destination device prior to data communication between the digital camera 106 and the printer 107 and obtaining an IPv6 address of the destination device.

Next, the function of the rendezvous server 109 will be briefly described. Device information of the digital still camera 106 and the printer 107 are registered in the rendezvous server 109. As the registered information, IPv6 addresses assigned to the digital still camera 106 and the printer 107, their status information (device type, flag indicating whether or not access from an external network can be received, and the like) are registered. Further, it is possible for an IPv6 internet-connectable device, such as the digital still camera 106, the printer 107 or the like connected to the IPv6 internet 103, to inquire about an IPv6 address of a communication destination device (name resolution) from the rendezvous server 109. The details of the inquiry will be described later.

As inquiry information in name resolution from the IPv6 internet-connectable device, a device unique ID, information of network to which the inquirer device itself belongs or the like can be utilized. The rendezvous server 109 receives an inquiry about an address of communication destination including these information, refers to the registered device information as described above, and returns a response to the inquiry to the inquirer device.

FIG. 2 is a table showing an example of respective network information and IPv6 addresses of the networks, devices and terminals connected to the networks. As shown in FIG. 2, an IPv6 network address "2001:340:1:2::" with a prefix length of 64 is assigned to the network A 101. An IPv6 network address "3ffe:514:2:1::" with a prefix length of 64 is assigned to the network B 102.

Next, the hardware construction of an information processing apparatus which performs a software program to realize the functions of the above-described session management server 108 and the rendezvous server 109 will be described.

Figure 3:
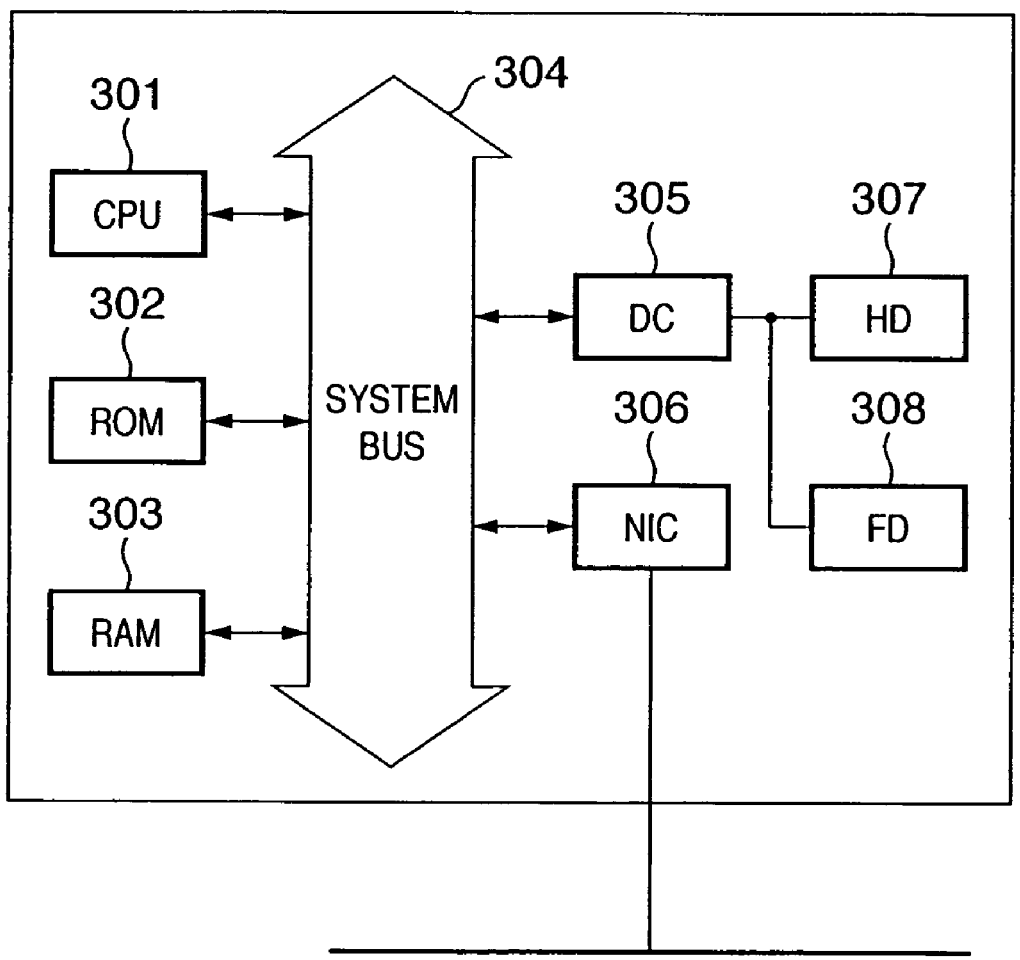
FIG. 3 is a block diagram showing the construction of an information processing apparatus according to the embodiment.

FIG. 3 is a block diagram showing the construction of an information processing apparatus according to the present embodiment. As shown in FIG. 3, in the information processing apparatus, a CPU 301, a ROM 302, a RAM 303, a hard disk (HD) 307 and a disk controller (DC) 305 for a floppy (registered trademark) disk (FD) 308, and a network interface card (NIC) 306 are communicably interconnected via a system bus 304. The system bus 304 is connected to the network A 101 and the network B 102 in FIG. 1 via the network interface card 306.

The CPU 301 performs a software program stored in the ROM 302 or the HD 307 or a software program provided from the FD 308, thereby controls the respective constituents connected to the system bus 304. That is, the CPU 301 reads a processing program according to the processing sequence as described above from the ROM 302, HD 307 or the FD 308 and executes the program, thereby performs control to realize the operation of the present embodiment.

The RAM 303 functions as a main memory or work area for the CPU 301. The DC 305 controls access to the HD 307 holding a boot program, various application programs, an editing file, a user file, a network management program, a processing program to be described later and the like, and to the FD 308.

The NIC 306 performs mutual data transmission by using an IPv4 communication protocol with a communication terminal or the like connected to an IPv4 internet via the network A 101 or the network B 102. Further, the NIC 306 performs mutual data transmission by using an IPv6 communication protocol with a communication terminal or the like connected to the IPv6 internet via the network A 101 or the network B 102.

Next, name resolution processing by the session management server 108 and the rendezvous server 109 for the user B's printer 107 from the user A's digital still camera 106 will be described.

Figure 4:
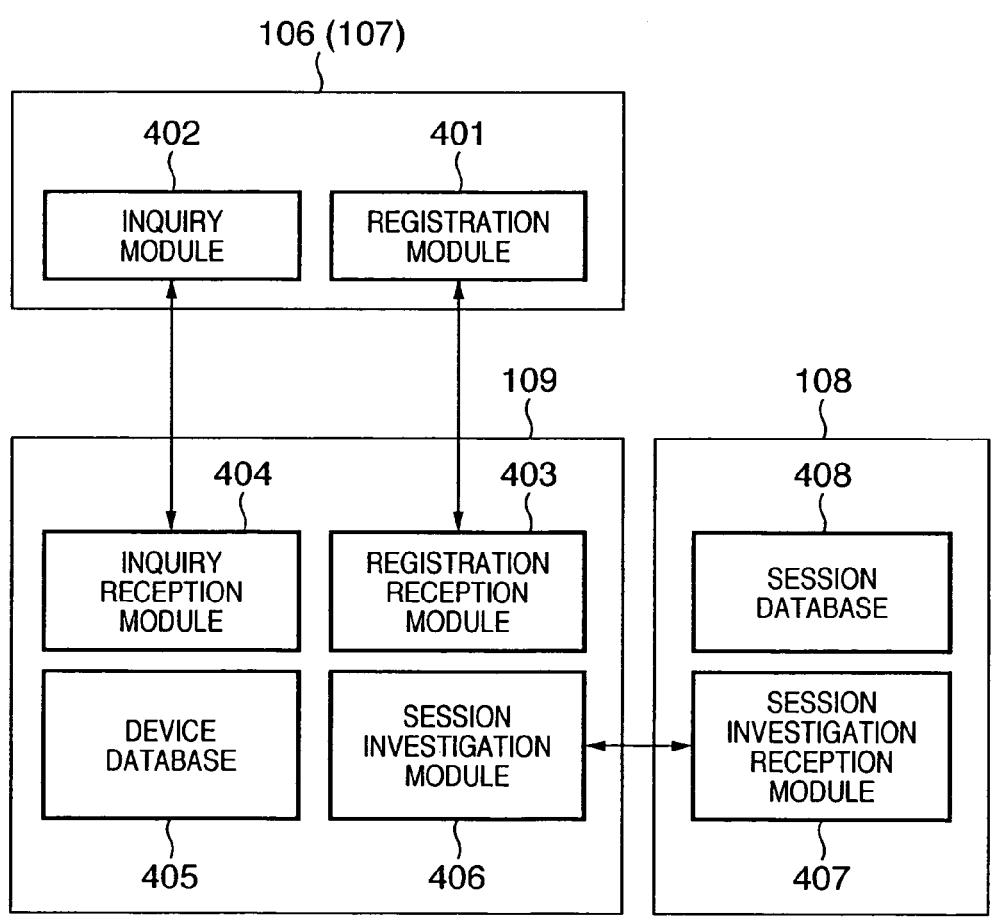
FIG. 4 is a block diagram showing the construction of modules for name resolution processing according to the embodiment.

FIG. 4 is a block diagram showing the construction of modules for name resolution processing according to the embodiment. In the name resolution processing, performed for the purpose of transmitting data in the user A's digital still camera 106 to the user B's printer 107, the printer 107 owned by the user B is found by a search and specified, and its IPv6 address is obtained.

As shown in FIG. 4, the digital still camera 106 has a registration module 401 to register device information of the camera itself in the rendezvous server 109 and an inquiry module 402 to inquire about an IP address of a communication destination device from the rendezvous server 109 for peer-to-peer data communication with the destination device. The printer 107 also has the registration module 401 and the inquiry module 402. The registration module 401 is started when the power of the device is turned on and the device is connected to the network or when the status of the device has changed, and the registration module 401 notifies the device information to the rendezvous server 109.

On the other hand, the rendezvous server 109 has a registration reception module 403 to receive and process a registration message from the registration module 401, an inquiry reception module 404 to receive and process an inquiry message from the inquiry module 402, a device database 405 holding registration information received by the registration reception module 403, and a session investigation module 406 to investigate the status of current internet telephone communication in the session management server 108. The device database 405 is provided on the RAM 303 or the HD 307.

The session management server 108 to manage sessions between the internet telephone terminals has a session investigation reception module 407 to receive and process an order from the session investigation module 406 in the rendezvous server 109 and a session database 408 holding information on the status of current internet telephone communication. The session database 408 is provided on the RAM 303 or the HD 307.

FIG. 5 is a table showing an example of device information registered in the device database 405 in the rendezvous server 109. As shown in FIG. 5, in the present embodiment, a device ID 501, a type 502, an address 503, a prefix length 504 and a net access 505 are registered as the device information.

Next, the respective items of the device information will be described. The device ID 501 is unique identification information of each device. The type 502 is information indicating whether the device is a camera or a printer. The address 503 is an IPv6 address currently used by the device. The prefix length 504 is a prefix length of the IPv6 address. The net access 505 is a flag to define whether or not an external access request to the device can be accepted.

Note that the device ID 501 and the type 502 are information uniquely assigned to the device, and the IPv6 address 503 and the prefix length 504 vary depending on a network to which the device is connected. Further, the net access 505 varies by turning on/off an access control switch provided in the device. In the device database 405, information of various devices are collected via the IPv6 internet 103. For example, in addition to device information 511 of the user A's digital still camera 106 and device information 512 of the user B's printer 107, device information 513 of another device existing in another network is registered.

FIG. 6 is a table showing an example of session information recorded in the session database 408 in the session management server 108. As shown in FIG. 6, in the present embodiment, a session ID 601, a status 602, an address 603 and an address 604 are recorded as session information of internet telephone terminal.

Next, the respective items of the session information will be described. The session ID 601 is used as an identifier indicating unique session information in the session management server 108. The status 602 indicates a current status in the session. The address 603 indicate an IPv6 address of one internet telephone terminal of the session and its prefix length, and the address 604, an IPv6 address of the other internet telephone terminal of the session and its prefix length. The status 602 indicates whether calling processing is being performed (ring), communication is being made (connect), or disconnection processing is being performed (bye) between the couple of internet telephone terminals.

Note that in a case where a session has been completely broken, the entry of session information is deleted from the session database 408. In FIG. 6, session information 611 indicates that communication is being currently performed between the user A's internet telephone terminal A 104 and the user B's internet telephone terminal B 105.

Next, processing by the inquiry reception module 404 in the rendezvous server 109 for receiving an inquiry message from the digital still camera 106 and performing name resolution for connection with the user B's device while the user A is talking with the user B by using the internet telephone A will be described.

Figure 7:
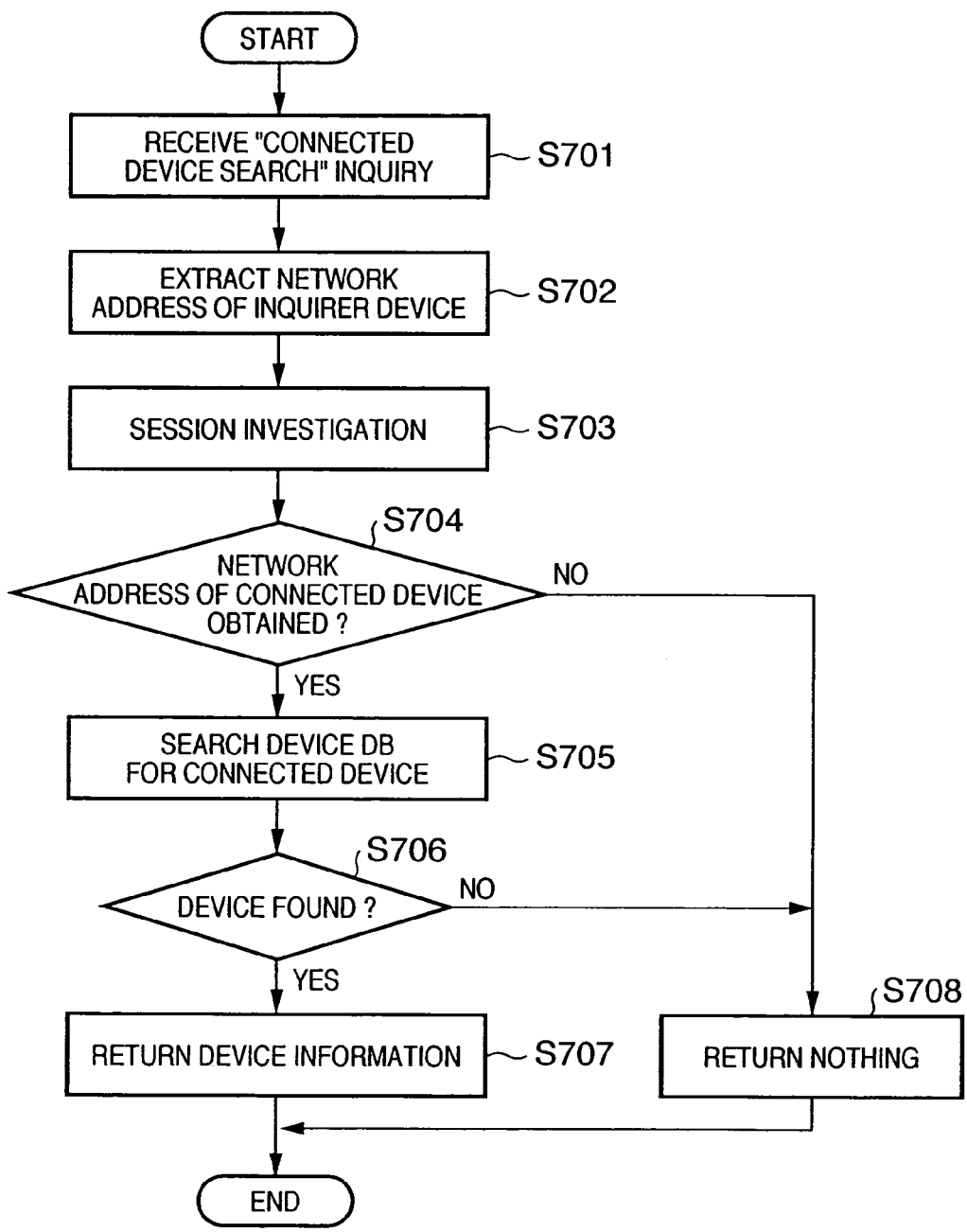
FIG. 7 is a flowchart showing name resolution processing according to the embodiment.

FIG. 7 is a flowchart showing name resolution processing according to the embodiment. First, at step S701, the inquiry reception module 404 in the rendezvous server 109 receives an inquiry message from the device (digital still camera 106) via the network A. The inquiry message is a "connected device search" message for name resolution performed for the purpose of connection with the user B's device when the user A is talking with the user B by using the internet telephone.

Note that the "connected device search" inquiry message includes information indicating the type of inquiry (search for connected device) and a device ID of the inquirer device (digital still camera 106).

Next, at step S702, it is recognized that the type of the received inquiry message is "search for connected device", and processing to extract an IPv6 network address of the inquirer device (digital still camera 106) is performed. That is, in a case where the digital still camera 106 holds the IPv6 address in FIG. 2, the extracted IPv6 network address is "2001:340:1:2::". In the extraction processing, a search is made in the device information registered in the device database 405 (FIG. 5) based on the device ID included in the inquiry message, and the IPv6 address is obtained from the address 503 of the corresponding device information. Further, the prefix length "/64" is obtained in a similar manner.

Next, at step S703, the inquiry reception module 404 forwards the extracted IPv6 network address information (2001:340:1:2::/64) of the inquirer device (digital still camera 106) to the session investigation module 406 to investigate the current session status. In the session investigation, based on the IPv6 network address information, an IPv6 network address of an internet telephone as the destination terminal of current communication by the internet telephone belonging to the extracted IPv6 network address is obtained. Note that the details of the session investigation will be further described with reference to FIG. 8 later.

Next, at step S704, the inquiry reception module 404 checks whether or not an IPv6 network address has been obtained by the session investigation at step S703. In the present embodiment, as communication is being performed between the user A's internet telephone A 104 and the user B's internet telephone B 105, the obtained result is "3ffe:514:2:1::/64". If it is determined that the network address of the connection destination has been obtained, the process proceeds to step S705, at which the device database 405 (FIG. 5) is referred to based on the IPv6 network address to search for a device which is connected to the same network and in which the net access 505 is on. That is, in the device database in FIG. 5, the device information 512 (printer 107) is detected as a device connected to the IPv6 network address (3ffe:514:2:1::/64) of the user B talking with the user A. Further, as the net access 505 of the device information 512 (printer 107) is on, the device information 512 is obtained.

Next, at step S706, the inquiry reception module 404 checks the result of device search at step S705. If it is determined that corresponding device information has been detected, the process proceeds to step S707, at which the device information detected at step S705 is returned to the inquirer device (digital still camera 106) is performed, and the entire process ends.

On the other hand, if it is determined at steps S704 and S706 that corresponding device information has not been detected, the process proceeds to step S708, at which a response is returned to the inquirer device (digital still camera 106) with no data. This event occurs when, e.g., there is no network of a destination of internet telephone communication or internet telephone communication is performed but there is no access permitted device on the communication destination side.

Figure 8:
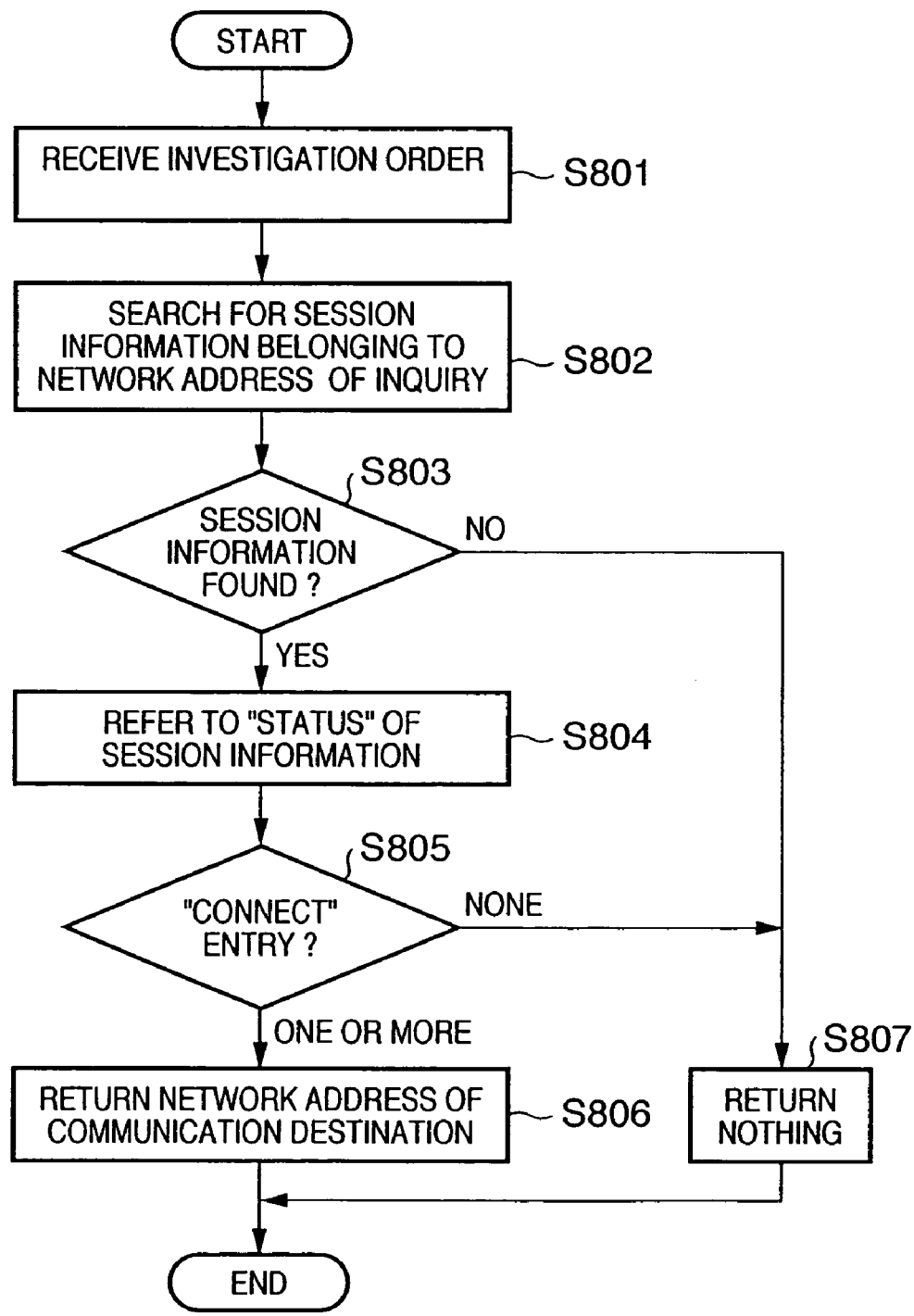
FIG. 8 is a flowchart showing session investigation processing at step S703 in FIG. 7.

FIG. 8 is a flowchart showing the session investigation processing at step S703 in FIG. 7. This processing is performed by the session investigation reception module 407 in the session management server 108 upon reception of a session investigation order from the session investigation module 406 in the rendezvous server 109.

First, at step S801, the session investigation reception module 407 in the session management server 108 receives a session investigation order. At this time, an IPv6 network address information as the subject of session investigation is also received. Next, at step S802, a search is made in the session database 408 (FIG. 6) based on the received IPv6 network address information, to obtain corresponding session information. That is, an internet telephone terminal belonging to the same network as that of the IPv6 network address information (2001:340:1:2::/64) sent with the session investigation order is found. In the case of the session database in FIG. 6, the address item 603 of session information 611 corresponding to the IPv6 network address information is detected.

Next, at step S803, the result of search at step S802 is checked. If it is determined that corresponding session information has been detected, the process proceeds to step S804, at which the status item 602 is referred to based on the detected session information. This processing is performed for the purpose of obtaining IPv6 network address (3ffe:514: 2:1::/64) information of the destination party (user B) currently communicating with the internet telephone terminal A 104 belonging to the IPv6 network address (2001:340:1:2::/ 64) sent with the session investigation order.

Next, at step S805, the result of processing at step S804 is checked. If it is determined that one or more corresponding session information (session information where the status 602 indicates a communication status (connect)) have been detected, the process proceeds to step S806, at which an IPv6 network address of the destination party is extracted based on the detected session information. The extracted IPv6 network address is notified to the inquiry reception module 404 via the session investigation module 406 in the rendezvous server 109. That is, the address item 604 of the connection destination in the detected session information 611 is referred to, then the IPv6 network address (3ffe:514:2:1::/64) is extracted, and the IPv6 network address is notified to the rendezvous server 109.

On the other hand, at the above-described steps S803 and S805, if it is determined that no corresponding session information has been obtained, the process proceeds to step S807, at which a response without data is notified to the inquiry reception module 404 via the session investigation module 406. This event occurs when internet telephone communication is not performed.

Next, a communication sequence of name resolution for the user B's printer 107 from the user A's digital still camera 106 will be described.

Figure 9:
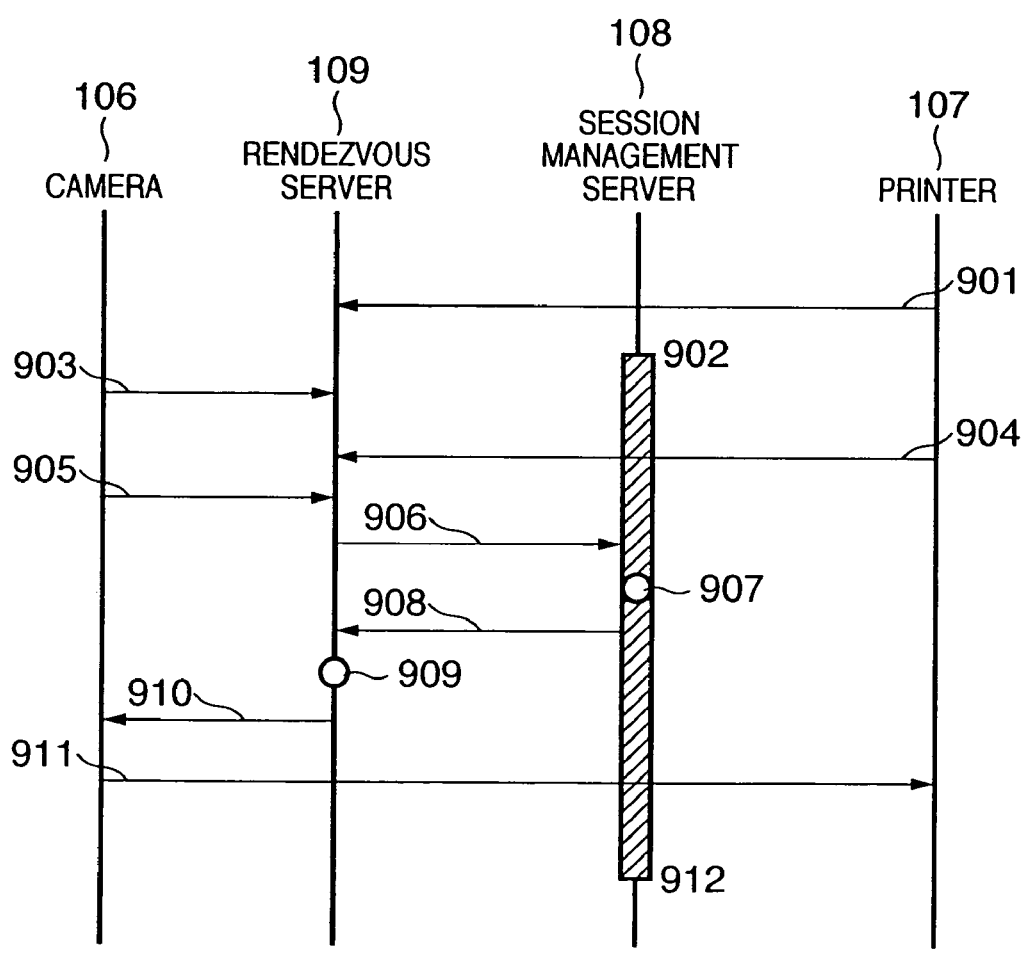
FIG. 9 is a timing chart showing a communication sequence of the name resolution processing according to the embodiment.

FIG. 9 is a timing chart showing the communication sequence of name resolution processing according to the embodiment. When the power of the user B's printer 107 is turned on and the printer is connected to the network B 102, the registration module 401 in the printer 107 transmits the device ID, the type, the IPv6 address and prefix length, and the net access flag to the registration reception module 403 in the rendezvous server 109 (901). By this communication, the device information of the printer 107 is registered in the device database 405 (FIG. 5) in the rendezvous server 109.

Thereafter, when the user A and the user B start communication by their internet telephones, session information indicating that communication is being performed between the user A's internet telephone terminal A 104 and the user B's internet telephone terminal B105 is registered in the session database 408 (FIG. 6) in the session management server 108 (902). In this communication, if the users A and B determine to transmit data from the user A's digital still camera 106 to the user B's printer 107, the user A connects the digital still camera 106 to the network A 101 in preparation for data transmission (903). At this time, the device information of the user A's digital still camera 106 is registered in the device database 405 (FIG. 5) in the rendezvous server 109.

On the other hand, the user B turns on the network access switch of the printer 107 for receiving data from the user A. At this time, as the device status has been changed, new device information is transmitted from the registration module 401 in the printer 107 to the rendezvous server 109 (904). When the communication preparation has been completed in the both devices, the user A executes the "connected device search" inquiry from the digital still camera 106. At this time, the "connected device search" inquiry message is sent from the inquiry module 402 in the digital still camera 106 to the inquiry reception module 404 in the rendezvous server 109 (905).

On the other hand, the rendezvous server 109 receives the inquiry, then performs the processing by the inquiry reception module 404 described in FIG. 7, and a session investigation order is sent via the session investigation module 406 and the session investigation reception module 407 to the session management server 108 (906). Then the session investigation processing described in FIG. 8 is performed (907). As the internet telephone communication is being performed between the user A and the user B, the user B's network address "3ffe:514:2:1::/64" is detected. Note that in a case where internet telephone communication is not being performed, a communication destination cannot be specified.

The detected network address information is notified to the rendezvous server 109 (908). The rendezvous server 109 receives the result of session investigation, then the inquiry reception module 404 makes a search for a device connected to the network of the communication destination (user B), and detects corresponding device information (909). In the detection processing, as described at step S705 in FIG. 7, it is possible to detect only a device where the net access flag is on from devices connected to the network of the communication destination (user B) and thus limit access from unspecified devices.

Next, the detected device information 512 is returned as the result of inquiry to the inquirer device (digital still camera 106) (910). The digital still camera 106 receives the result of inquiry, and information on the printer 107, owned by the user B as the destination of the internet telephone communication with the user A, is displayed. The user A checks the displayed contents and performs data transmission to the printer 107 (911). Thereafter, the user A and the user B check the data transmission/reception by the internet telephone communication, and disconnects the communication (912).

Note that in the present embodiment, the IPv6 communication protocol is used as a communication protocol, however, the communication protocol is not limited to the IPv6 communication protocol.

Further, the rendezvous server 109 and the session management server 108 are separately provided, however, they are not necessarily physically separated. That is, the session management server 108 may be provided with the functions of the above-described rendezvous server (registration of device information, name resolution and the like) in addition to the function of internet telephone terminal session management. In this arrangement, in the session management server 108, the session information may be stored in the session database 408 as shown in FIG. 10.

In the session database 408 in FIG. 10, the session information is synchronized with the device information in FIG. 5. That is, based on the IPv6 addresses and prefix lengths 603 and 604 of the internet telephone terminals (104 and 105) forming a session, a device belonging to the same network as that of the internet telephone terminals (104 and 105) forming the session is found from the device database 405, and the device information of the detected device is registered as information 651 and 652 in the session database 408.

For example, based on the IPv6 address and prefix lengths 603 and 604 of session information 611, devices having network address corresponding to the network address "2001: 340:1:2::1" (higher 64 bits) and the network address "3ffe: 514:2:1::1" (higher 64 bits) are detected from the device database 405, then the device information 512 and 511 are obtained and registered as the information 651 and 652 in the session database 408.

Upon search in the device database 405, network address are examined based on the address 503 and the prefix length 504 of device information, and further, a device where the net access 505 is on is detected.

When the session management server 108 receives the "detected device search" inquiry message from the digital still camera 106, the server searches the device database 405 for corresponding device information 511 based on the IPv6 address of the digital still camera 106 included in the inquiry message, then searches the session database 408 based on the device information 511 to obtain corresponding device information 512, and transmits the device information 512 to the digital still camera 106.

The session database in FIG. 10 shows that the internet telephone A 104 and the internet telephone B 105 are being connected (session information 611), the digital still camera 106 is connected to the network A 101 the same as that of the internet telephone A 104 (device information 511), and the printer 107 is connected to the network B 102 the same as that of the internet telephone B 105 (device information 512).

Further, the "network address" is transmitted as session investigation information to the session management server 108, however, any other information to specify network information may be employed.

Further, a communication destination is specified based on an internet telephone connection status, however, the communication destination may be specified based on the status of any other communication device.

Further, devices to perform data communication are not limited to the digital still camera and the printer.

Further, the object of the present invention can also be achieved by providing a storage medium (or recording medium) holding software program code for performing the functions of the above-described embodiment to a system or an apparatus, reading the program code with a computer (e.g., CPU, MPU) of the system or apparatus from the storage medium, then executing the program.

In this case, the program code read from the storage medium realizes the functions according to the embodiment, and the storage medium holding the program code constitutes the invention.

Further, the storage medium, such as a floppy (registered trademark) disk, a hard disk, an optical disk, a magneto-optical disk, a CD-ROM, a CD-R, a DVD, a magnetic tape, a non-volatile type memory card, and ROM can be used for providing the program code.

Furthermore, besides aforesaid functions according to the above embodiment are realized by executing the program code which is read by a computer, the present invention includes a case where an OS (operating system) or the like working on the computer performs a part or entire actual processing in accordance with designations of the program code and realizes functions according to the above embodiment.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiment.

The present invention is not limited to the above embodiments and various changes and modifications can be made within the spirit and scope of the present invention. Therefore, to appraise the public of the scope of the present invention, the following claims are made.

CLAIM OF PRIORITY

This application claims priority from Japanese Patent Application No. 2003-201929 filed on Jul. 25, 2003, the entire contents of which are hereby incorporated by reference herein.

What is claimed is:

1. A management apparatus that manages terminal information, comprising:
   reception means for receiving a search request from a first terminal, wherein the first terminal is connected to a first network, and wherein a second terminal is connected to the first network;
   storage means storing a session information table identifying communication sessions between two or more terminals, and including, for each communication session, network address in formation of said two or more terminals and status information of said communication session, wherein the status information comprises one of: (1) said two or more terminals are in communication, (2) said two or more terminals are establishing communication, and (3) said two or more terminals are disconnecting from communication;
   session management means for receiving new session information including network address information of said two or more terminals, and updating the session information table based on the received new session information;
   searching means for searching for a second network using said session information table, such that a third terminal is connected to the second network and the third terminal is a telephone communication partner of the second terminal and is in communication with the second terminal, and wherein network address and status information of the first network to which the first and second terminals are connected is employed in said searching; and
   reply means for returning, to the first terminal, terminal information on a fourth terminal in a case where the second terminal connected to the first network is performing a telephone communication with the third terminal connected to the second network, wherein the fourth terminal is connected to the second network.

2. The management apparatus according to claim 1, wherein said searching means searches the currently telephonically communicating second terminal connected to the first network based on a network address of the first terminal, and decides the second network to which the telephone communication partner of the searched second terminal is connected.

3. The management apparatus according to claim 1, wherein the reply means returns network address information to the first terminal, as the terminal information on the fourth terminal connected to the second network.

4. The management apparatus according to claim 1, wherein the management apparatus is connected to the third network, and the third network provides data communication between the first network and the second network.

5. A control method for management apparatus that manages terminal information, comprising:
- storing a session information table identifying communication sessions between two or more terminals and including, for each communication session, network address information of said two or more terminals and status information of said communication session, wherein the status information comprises one of: (1) said two or more terminals are in communication, (2) said two or more terminals are establishing communication, and (3) said two or more terminals are disconnecting from communication;
- receiving new session information including network address information of said two or more terminals and updating the session information table based on the received new session information;
- receiving a search request from a first terminal, wherein the first terminal is connected to a first network, and wherein a second terminal is connected to the first network;
- searching for a second network, using said session information table, such that a third terminal is connected to the second network and the third terminal is a telephone communication partner of the second terminal and is in communication with the second terminal, and wherein network address and status information at the first network to which the first and second terminals are connected is employed in said searching; and
- returning, to the first terminal, terminal information on a fourth terminal in a case where the second terminal connected to the first network is performing a telephone communication with the third terminal connected to the second network, wherein the fourth terminal is connected to the second network.

6. The control method according to claim 5, wherein, in the searching, the currently telephonically communicating second terminal connected to the first network is searched, based on a network address of the first terminal, and the second network to which the telephone communication partner of the searched second terminal is connected is decided.

7. The control method according to claim 5, wherein, in the returning, network address information is returned to the first terminal, as the terminal information on the fourth terminal connected to the second network.

8. A computer-readable recording medium storing a computer-executable program, said computer-executable program comprising:
- storing a session information table identifying communication sessions between two or more terminals and including, for each communication session, network address information of said two or more terminals and status information of said communication session, wherein the status information comprises one of: (1) said two or more terminals are in communication, (2) said two or more terminals are establishing communication, and (3) said two or more terminals are disconnecting from communication;
- receiving new session information including network address information of said two or more terminals and updating the session information table based on the received new session information;
- receiving a search request from a first terminal, wherein the first terminal is connected to a first network, and wherein a second terminal is connected to the first network;
- searching for a second network, using said session information table, such that a third terminal is connected to the second network and the third terminal is a telephone communication partner of the second terminal and is in communication with the second terminal, and wherein network address and status information of the first network to which the first and second terminals are connected is employed in said searching; and
- returning, to the first terminal, terminal information on a fourth terminal, in a case where the second terminal connected to the first network is performing a telephone communication with the third terminal connected to the second network, wherein the fourth terminal is connected to the second network.

9. The computer-readable recording medium according to claim 8, wherein, in the searching, the currently telephonically communicating second terminal connected to the first network is searched, based on a network address of the first terminal, and the second network to which the telephone communication partner of the searched second terminal is connected is decided.

10. The computer-readable recording medium according to claim 8, wherein, in the returning, network address information is returned to the first terminal, as the terminal information on the fourth terminal connected to the second network.

* * * * *